June 11, 1957 T. O. LUFT 2,795,076
SPOON TYPE FISHING BAIT
Filed Sept. 8, 1955

INVENTOR.
THEODORE O. LUFT
BY
ATTORNEY

2,795,076

SPOON TYPE FISHING BAIT

Theodore O. Luft, Flint, Mich.

Application September 8, 1955, Serial No. 533,076

2 Claims. (Cl. 43—42.39)

This invention relates to a fish bait and more particularly to a spoon type fish bait useful for fishing conditions where the bait is not trolled or cast into the water but is merely dropped therein.

While various types of artificial fish baits, capable of fish attracting motions, have been known for many years, in general, these fish baits have been specifically designed and find their greatest use in trolling or casting type fishing where the bait is drawn through the water by the fisherman. With known baits the fish attracting motions thereof are due to the movement of the bait through the water in the casting or trolling operation. In fishing operations where the bait is not drawn through the water, e. g. ice fishing, such baits are not as effective as is desired because either they do not move in a fish attracting motion when merely dropped in the water or if they do move, such movements are not enticing to the fish.

Accordingly, it is a principal object of this invention to provide a fish bait which is particularly useful in fishing operations where the bait is not drawn through the water but is merely dropped therein.

It is a further object of this invention to provide a spoon type artificial fish bait which is so weighted that the bait, when dropped in the water, will sink therein and in sinking will move in such a manner as to attract and entice fish to strike thereat.

Other objects and advantages of this invention will become apparent to those with knowledge of equipment of this type upon reading the following description and inspecting the accompanying drawings, in which.

Figure 1:
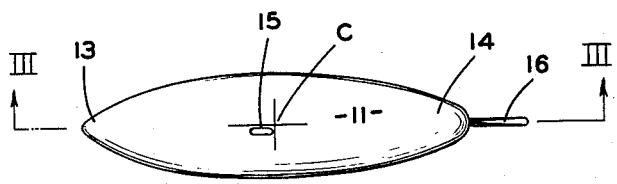
Figure 1 is a top view of my improved spoon type fish bait.
Figure 2:
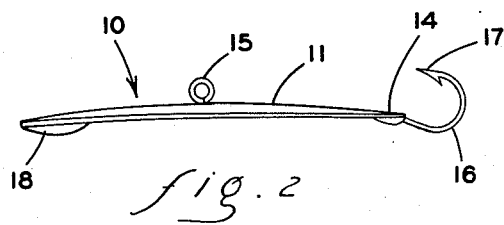
Figure 2 is a side view of the bait.
Figure 3:
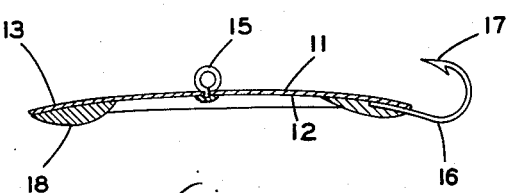
Figure 3 is a central sectional view of the bait, taken along the line III—III of Figure 1.

In meeting the objects and purposes set forth above as well as others related thereto, I have provided a spoon type fish bait. The fish line is attached to the spoon by an eye, which eye is located slightly off-set in both the longitudinal and transverse directions from the center of the spoon. A hook is attached to one end of the spoon with its barb extending toward said eye. A weight is provided on the opposite end of the spoon to balance the weight of the spoon and the natural bait customarily fixed thereon.

Detailed description

The spoon 10 is shaped, in general, like a shallow bowl and has a convex face 11 and a concave face 12. The spoon is substantially oval in plan view and includes two longitudinal ends 13 and 14. It will be noted that end 14 is slightly wider and rounder than end 13.

An eye 15 is secured to the convex face of the spoon and is adapted to have a fish line A attached thereto. The eye is located in the approximate center of the spoon but is off-set from the center slightly, and substantially equally, in both the longitudinal and transverse directions. Preferably, the distance which the eye is off-set from the center C of the spoon in both directions is quite small, usually on the order of one thirty-second of an inch or so.

A fish hook 16 is secured to the concave face of the spoon 10 adjacent end 14 thereof in any conventional way, such as by solder. The hook is arcuate in shape and curves upwardly and inwardly so that the barb 17 thereof is above the convex face of the spoon and is directed toward the eye 15.

A weight 18 which may conveniently be solder, is secured to the end 13 of the spoon, opposite to the hook, on the concave face thereof. The weight 18 is approximately equal to the weight of the hook together with the weight of the bait normally impaled on the hook when in use so that end 13 of the hook tips down somewhat when the bait is dropped in the water and lies substantially horizontally on the water when it is not descending therein.

Ordinarily the line A is relatively light, as a one or two pound nylon monofilament test line because a light line allows the bait to have a freer action.

Figure 4:
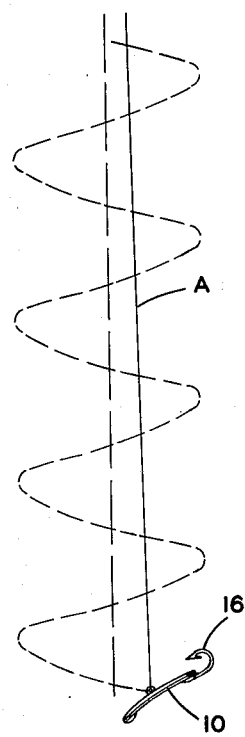
Figure 4 is a schematic representation of the movement of the bait after it is dropped in the water and glides downwardly therein.

When the spoon is dropped into the water and allowed to descend therein, end 13 will tip downwardly somewhat as the spoon descends. Because of the approximate central location of the eye 15 and the weight distribution of the spoon, the spoon will trace circles of relatively wide radius, e. g. one and one-half to two feet as it glides downwardly in the water (Figure 4). This motion of the bait has been found to be attractive to fish. If the eye 15 is located further away from the center of the bait, the radius of the circular path traced by the spoon will decrease, which in turn makes the motion of the spoon less and less attractive to the fish.

In addition, the approximately central location of the eye 15 and the position of the hook 16 facing the eye insures that a fish striking at the natural bait on the hook is hooked in the roof of the mouth rather than in the throat. Thus, if it is desired to throw the fish back in the water, the hook may be easily removed and the fish will have suffered no permanent injury.

Although the end 13 of the spoon tips downwardly as it descends through the water because of weight 18 thereon, when the spoon reaches the desired depth and is no longer descending in the water it will assume a substantially horizontal position. It has been observed that fish do not tend to strike at the bait as it descends in the water but rather wait under the bait until it has stopped descending and then strike at it. Thus the bait attracts the attention of the fish as it descends and when it stops the fish will strike. Since the bait is in a horizontal position the fish is more apt to take the bait lengthwise of the spoon and is, therefore, more sure to be hooked.

Although the above mentioned drawings and description refer to one particular, preferred embodiment of the invention, it is not my intention, implied or otherwise, to eliminate other variations or modifications of the invention unless specifically stated to the contrary in the hereinafter appended claims.

I claim:

1. In an artificial fish bait for still fishing, the combination comprising: an elongated spoon; line connecting means fixed to said spoon, said line connecting means being slightly off-set in both a longitudinal direction toward one longitudinal end of said spoon and a transverse direction from the center of said spoon; a fish hook fixed in non-moving relationship on the other longitudinal end of the spoon and extending toward said line connecting means; a weight attached to said one longitudinal end of said spoon, said weight balancing substantially the weight of said hook in such a fashion that said spoon lies substantially horizontal in the water when it is not moving vertically therein, said weight and the off-center location of said line connecting means causing fish-attracting motions of said bait when said bait is dropped into the water.

2. In an artificial fish bait for still fishing, the combination comprising: a spoon; said spoon having a generally convex face and a generally concave face, and being generally oval in shape; an eye secured to the convex face of the spoon, said eye being slightly off-set in both a longitudinal direction toward one longitudinal end of said spoon and a transverse direction from the center of said spoon; a fish hook fixed in non-moving relationship to the concave face of said spoon adjacent the other longitudinal end of said spoon, said hook being curved upwardly and inwardly and extending toward said eye; and a weight attached to the concave face of said spoon adjacent said one longitudinal end of said spoon, said weight being of sufficient mass to substantially balance the weight of the hook and to cause said other longitudinal end of said spoon to tip downwardly slightly and to cause the bait to move in a circle when the bait is moved vertically downwardly in the water, said weight also causing said bait to be substantially horizontal in the water when it is not moving vertically.

References Cited in the file of this patent

UNITED STATES PATENTS

| | | |
|---|---|---|
| 1,546,105 | Powell | July 14, 1925 |
| 1,833,581 | Jordan | Nov. 24, 1931 |
| 2,280,197 | Ounsworth | Apr. 21, 1942 |
| 2,463,889 | Lundemo | Mar. 8, 1949 |
| 2,597,317 | Gross | May 20, 1952 |
| 2,736,982 | Curtis | Mar. 6, 1956 |